United States Patent
Hanks (12) 
(10) Patent No.: US 6,538,966 B1
(45) Date of Patent: Mar. 25, 2003

(54) ACCURATE POSITIONING OF DATA MARKS AND SPACES RELATIVE TO GROOVE WOBBLE ON A REWRITABLE OPTICAL DISC

(75) Inventor: D Mitchel Hanks, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 234 days.

(21) Appl. No.: 09/684,569

(22) Filed: Oct. 6, 2000

(51) Int. Cl.$^7$ .............................................. G11B 5/09
(52) U.S. Cl. .............................. 369/47.28; 369/53.34
(58) Field of Search ........................ 369/44.13, 47.15, 369/47.19, 47.25, 47.27, 47.28, 47.35, 53.31, 53.34, 59.12, 59.2, 116

(56) References Cited

U.S. PATENT DOCUMENTS

| | | | |
|---|---|---|---|
| 5,050,156 A | * 9/1991 | Barton | 369/116 |
| 5,070,495 A | * 12/1991 | Bletscher, Jr. et al. | 369/116 |
| 5,852,599 A | 12/1998 | Fuji | |
| 5,933,411 A | 8/1999 | Inui et al. | |
| 6,046,968 A | 4/2000 | Abramovitch et al. | |
| 6,101,158 A | * 8/2000 | Hogan | 369/124.14 |

OTHER PUBLICATIONS

Abramovitch et al; "High Frequency Wobbles: A Write Clock Generation Method for Rewritable DVD That Enables Near Drop–In Capacity With DVD–ROMs"; Feb. 2000; Inclusive pp.: 846–854; Japanese Journal of Applied Physics, Part 1 (Regular Papers, Short Notes & Review Papers) vol. 39, No. 2B.

Watanabe et al; Examination of the Read/Write Characteristics of an MO Signal With a Wobbled Groove Clock; SPIE vol. 3401; pp. 2–5.

Yoshida et al; "4.7 Gbyte Re–Writable Disc System Based On DVD–R System"; Nov. 1999; IEEE Transactions on Consumer Electronics, vol. 45, No. 4; pp. 1270–1276.

* cited by examiner

Primary Examiner—Paul W. Huber
(74) Attorney, Agent, or Firm—Augustus W. Winfield (57) ABSTRACT

In an optical disc drive, an analog calibration signal is generated that combines timing reference information and data information. During reading, and during writing of amorphous areas, the drive modulates the normally constant current supplied to the laser diode. The laser intensity is modulated normally during writing of reflective areas. The relative magnitudes of the intensity modulations, as measured in the calibration signal, are used to adjust the timing of writing data relative to a reference signal. Calibration may be made during reading or writing, without interfering with reading or writing.

12 Claims, 10 Drawing Sheets

FIG. 5B LASER INTENSITY

FIG. 5C ANALOG READ-DATA

FIG. 5D CALIBRATION SIGNAL

FIG. 5E WRITE-CLOCK

ACCURATE POSITIONING OF DATA MARKS AND SPACES RELATIVE TO GROOVE WOBBLE ON A REWRITABLE OPTICAL DISC

FIELD OF INVENTION

This invention relates generally to rewritable optical discs and optical disc drives used for digital data storage, and more specifically to an improved system and method for writing data relative to a sinusoidally varying displacement of a groove structure on an optical disc.

BACKGROUND OF THE INVENTION

For rewritable media, on which data can be appended to a partially recorded medium, and on which previously written data can be erased and overwritten, data formats commonly provide gaps in the data for accommodating angular speed variations between drives, and for accommodating write clock drift. Rewritable data formats also commonly provide clock synchronization patterns for adjusting the write clock frequency and phase. For example, magnetic discs and tapes are typically formatted into sectors, with each sector including a preamble having a pattern suitable for synchronizing a write clock, and with each sector including extra space at the end to allow for variations in media velocity. Synchronization patterns and data gaps reduce effective data capacity because they occupy space that could otherwise be occupied by user data.

In contrast, some proposed formats for rewritable Digital Versatile Discs (DVD) do not have clock synchronization fields in the data or extra space at the end of data fields. Instead, these DVD formats require spatial features on the disc, and these DVD formats require data marks and spaces to be positioned, when written, with sub-bit accuracy relative to the spatial features on the disc. Because data integrity requires precise timing based on location of data marks and spaces, there is a general need for writing data marks and spaces at precise positions, and to be able to verify the placement precision. In general, the beginning and end of data marks and spaces are defined by edges of a write clock. However, there are various signal path delays that may vary with time and temperature, and signal path delays that may vary from drive to drive. In addition, the impact of these signal path delays may vary depending on the speed at which the disc is rotating during writing. There is a further need for an ability to control and verify spatial placement precision of data marks and spaces, even with variable unknown signal path delays.

Some optical disc formats have a land and groove structure, with at least one sidewall of the groove having a sinusoidal radial displacement (called wobble). See, for example, U.S. Pat. No. 6,046,968 (Abramovitch). Groove wobble may be frequency modulated to encode time or address information, or groove wobble may be used as a timing reference to synchronize a write clock. Some optical disc formats provide spatial features, such as notches in groove sidewalls, that are used for index marks, sector addresses, or for additional phase control of a write clock. See, for example, U.S. Pat. No. 5,933,411 (Inui et al.), and U.S. Pat. No. 5,852,599 (Fuji). See also, for example, M. Yoshida et al., "4.7 Gbyte Re-writable Disc System Based on DVD-R System", *IEEE Transactions on Consumer Electronics*, Nov. 1, 1999, v 45, n 4, pp 1270–1276 (Yoshida et al.).

Optical disc drives may be required to rewrite multiple media formats. In general, an optical drive may not be able to depend on the presence of notches or tabs or similar spatial features on the medium (other than wobble) for timing control. Accordingly, there is a need for an ability to control and verify spatial placement of data marks and spaces without requiring spatial features on the medium other than wobble.

The light received at the surface of the detector array is not uniform, but instead comprises interference patterns, resulting in an intensity distribution. Binary data are encoded as transitions between areas of contrasting reflectance, or by pits and lands that affect the phase (and interference patterns) of the reflected light. Rewritable optical disc media commonly use a phase change material in a recording layer. During writing, the phase change material becomes crystalline when heated to just below its melting point and then cooled at a relatively slow rate, and amorphous when heated above its melting point and then cooled quickly. Data marks and spaces are formed by using focused laser light to heat small areas of the phase change material to one of two levels, and then allowing the material to cool. Crystalline areas typically reflect more light than amorphous areas. In general, the definitions of marks and spaces are arbitrary. That is, marks may be crystalline and spaces amorphous, or vice versa, and in general, marks may be more reflective than spaces, or marks may be less reflective than spaces. In the present patent document, marks are assumed to be crystalline, spaces are assumed to be amorphous, and crystalline areas are assumed to be more reflective than amorphous areas.

Figure 1:
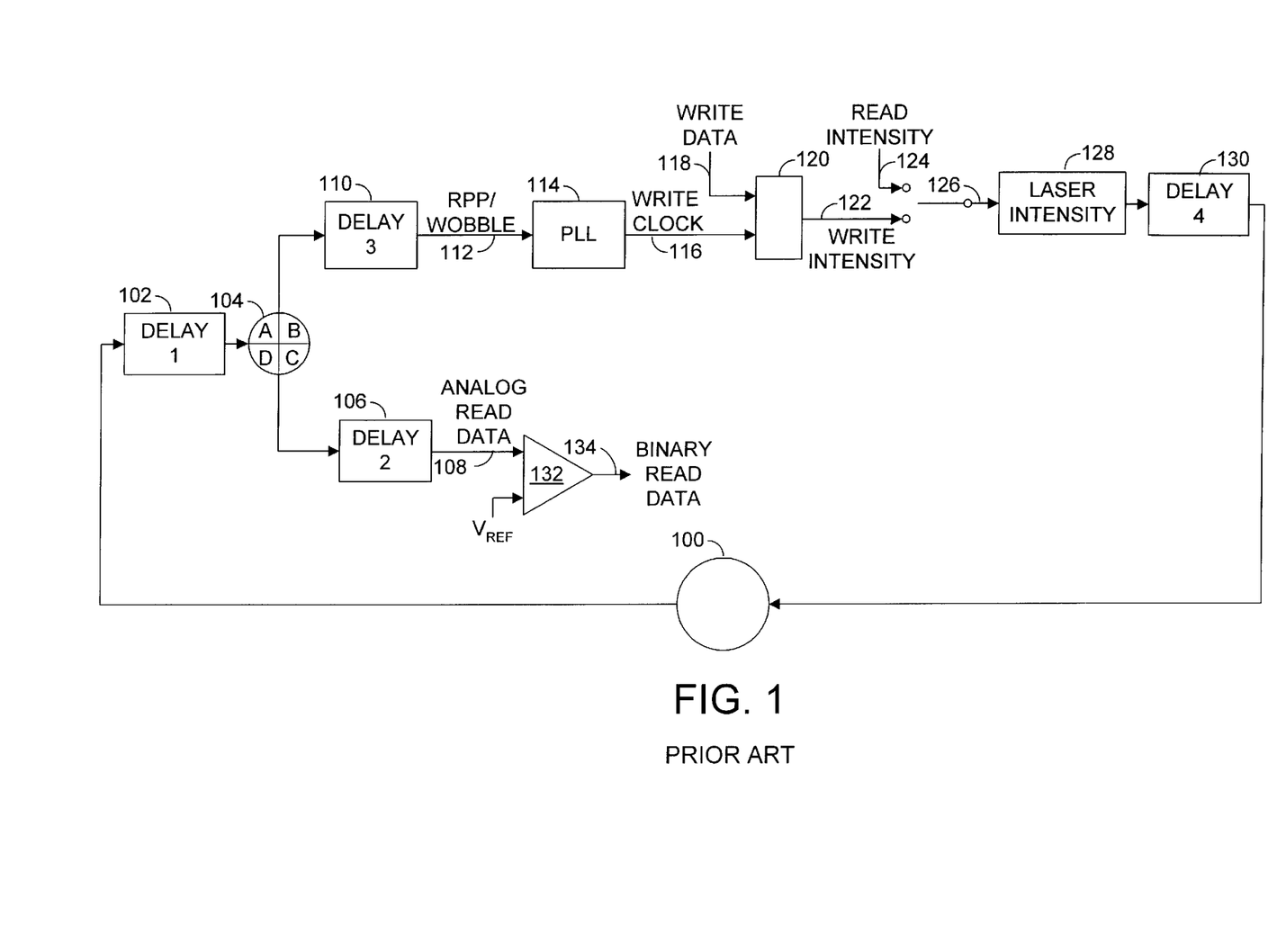
FIG. 1 (prior art) is a block diagram of the signal paths for an example optical disc drive, illustrating various signal path delays.

FIG. 1 (prior art) is a block diagram showing some of the signal paths in an example optical disc drive, to illustrate examples of various signal delays. In many optical disc drives, a single optical detector is used to generate a data signal, a radial position error signal, a focus error signal, and a wobble signal. FIG. 1 illustrates various lumped path delays for an optical disc drive using one optical detector for multiple functions. In FIG. 1, a light spot 100 is focused onto a data layer of an optical disc. Light reflected from the disc passes through various optical components before being detected by an optical detector 104. In FIG. 1, optical path delays between the disc and the detector 104 are lumped as Delay 1 (102). As depicted in FIG. 1, the optical detector 104 is divided into four sections (A,B,C,D), with each section providing a separate signal. The sum of the four signals (A+B+C+D), with some electronic filtering and processing, is the Analog Read-Data signal (108). Analog Read-Data signal path delays, due to filtering and other electronic processing, are lumped as Delay 2 (106). A radial position error signal, called a Radial Push-Pull (RPP) signal (112), is derived by subtracting appropriate pairs of the quad detector signals, for example (A+D)−(B+C). For media with wobbled grooves, the wobble signal is a high frequency modulation of the relatively low frequency RPP signal. Wobble may be extracted as a separate signal by high pass filtering the RPP/wobble signal. Accordingly, in the present patent document, the wobble signal may be referred to as RPP/wobble, or just Wobble, with the understanding that the RPP signal and the Wobble signal are often combined. In FIG. 1, various electronic filtering and processing delays for the RPP/wobble signal (112) are lumped as Delay 3 (110). If the Wobble signal is used for synchronization of a write clock signal, the Wobble signal is typically received by a Phase-Locked Loop (PLL, 114). The output of the PLL is used for a Write-Clock (116). A latch 120 is used to synchronize edges of a Write-Data signal (118) to edges of the Write-Clock (116), generating a Write Intensity signal (122). A Laser Intensity circuit 128 is controlled either by the Write Intensity signal (122) or by a Read Intensity signal (124), and the Laser Intensity circuit then controls the intensity of a laser diode light source. In FIG. 1, signal path delays in driving the Laser Intensity circuit 128, as well as any optical path delays, are lumped as Delay 4 (130).

Typically, Delay 1 and Delay 4 are negligible. Delay 2, Delay 3, delay through the PLL 114, and delay through the latch 120, however, are significant, and all may vary with time and temperature, and all may vary from drive to drive. In particular, note that there is a significant variable path delay (Delay 3+PLL+latch) between the time of a zero-crossing of spatial wobble and the time of an edge of the Write Intensity signal (122) in response to the zero-crossing of spatial wobble. Note also that the relative effects of these delays may vary if the writing speeds are different between drives. For example, if a disc is partially written in a drive at 1×speed, and rewritten in a drive at 2×speed, the delays have a different effect for the 2×drive relative to the 1×drive.

Consider a specific numeric example. In a proposed drive, a particular mark length is designated as a longest permissible mark, and longest marks must be placed with a leading edge at a zero-crossing of spatial wobble. For one particular writing speed, the specified maximum time from a spatial wobble zero-crossing to a spatial leading edge of a longest mark is on the order of 500 picoseconds. In a typical drive, Delay 2 is on the order of 2.5±1 nanoseconds. The total of Delay 3 plus delays in the PLL 114 and latch 120 is on the order of 5.5±3 nanoseconds. Therefore, even at one writing speed, the signal delays are on the order of 5–10 times the required precision, and the variability in the signal delays is on the order of 2–6 times the required precision. If a leading edge of a new longest mark is to be precisely located relative to a zero-crossing of spatial wobble, the system must compensate for Delay 2, and Delay 3, and the delays in the PLL 114 and the latch 120 in the example system of FIG. 1, or similar delays in functionally similar circuitry in other variations of drive designs.

SUMMARY OF THE INVENTION

A repetitive reference signal is obtained from a spatial feature on the disc. A repetitive Write-Timing signal is derived from the repetitive reference signal. The Write-Timing signal is offset in phase (earlier) relative to the reference signal. The system compensates for signal path delay by using the Write-Timing signal for writing data, thereby writing data early relative to the reference signal. In a specific example embodiment, the reference signal is derived from spatial wobble.

A calibration signal is generated that combines information used to generate the reference signal and to generate the Analog Read-Data signal. The data portion of the calibration signal, and the reference portion of the calibration signal, are both subject to the same delay. A calibration circuit measures signal amplitude (voltage or current) at two predetermined times in the calibration signal, and compares the magnitudes of the measured amplitudes. The phase of the Write-Timing signal, relative to the reference signal, is then adjusted based on the relative magnitudes of measurements of the calibration signal. In an example embodiment, the calibration circuit adjusts the phase of the feedback signal for a PLL relative to the phase of the Wobble signal, and the feedback signal for the PLL is used as the Write-Timing signal.

During reading, in the example embodiment, a drive modulates (reduces or increases current with an impulse) the normally constant current supplied to the laser diode. Read intensity impulses are generated in pairs, at times relative to a edge of the Write-Timing signal, during reading of a long mark or space. As a result of calibrating during long marks and spaces, no data signal transitions are present between or near two associated intensity impulses. The resulting calibration signal shows read intensity impulses superimposed on wobble, before and after a peak of the wobble as detected in the calibration signal. The phase of the Write-Timing signal is adjusted until the two intensity impulses, as detected in the calibration signal, are the same amplitude (and therefore symmetrical in time relative to a peak of the wobble as detected in the calibration signal). When the intensity impulses in the calibration signal are equal magnitude, the pulses have been written symmetrically relative to a peak of spatial wobble. Then, by using the Write-Timing signal during writing, an edge of a data mark is written at a time that has been adjusted for multiple signal path delays.

During writing of amorphous areas, the laser intensity is normally constant. Accordingly, for calibration during writing of amorphous areas, the laser can be modulated just as for calibration during reading. During writing of crystalline areas, the laser intensity is normally modulated to reduce the temperature of the focussed spot. For calibration during writing of crystalline areas, the calibration circuit monitors the normal modulations of laser intensity. For either type of area, the calibration signal shows intensity modulations superimposed on wobble. The phase of the feedback signal for the PLL is adjusted until two measured amplitudes of the calibration signal are equal (and therefore symmetrical in time relative to a peak of wobble as detected in the calibration signal).

By use of the calibration signal to adjust the phase of the feedback signal for the PLL, and by use of the feedback signal for the PLL as a Write-Timing signal, the example optical disc drive compensates for signal path delays. Adjustment of the phase of the Write-Timing signal is made frequently, during reading and writing, without requiring spatial timing features on the medium other than wobble.

DETAILED DESCRIPTION OF THE PREFERRED EMBODIMENT OF THE INVENTION

In the following discussion, one specific standard DVD format is used for illustration. However, there are multiple alternative proposed DVD formats, and the invention is applicable to many alternative optical disc formats. Information is typically encoded on a disc by using a run-length-limited modulation code. Such a code allows marks, and spaces between marks, to have several possible spatial lengths. All permitted spatial lengths are commonly expressed in terms of multiples of a length referred to as a channel bit. As the disc rotates relative to the optical transducer, spatial frequencies on the disc are translated into temporal frequencies in various signals from the optical transducer. It is common for one temporal cycle of the Write-Clock to correspond to the time required for a distance on the disc of one channel bit to rotate past the optical transducer. In particular, in the time domain, one cycle of the Write-Clock is commonly referred to as "T", and the signal times of the various marks and spaces are described in multiples of "T". In the example DVD format, the groove is radially symmetrically wobbled with a wobble period of 32 channel bits. That is, the frequency of the Write-Clock output of the PLL is 32 times the frequency of the Wobble signal input to the PLL.

For one common DVD standard, a channel bit has a length of 0.133 micrometers. The shortest mark or space is 3 channel bits long (0.400 micrometers), and the longest mark or space is 14 channel bits long (1.866 micrometers). In the example DVD format, the longest (14 channel bits) marks and spaces are used only as "sync marks". Data is encoded using marks and spaces that are 11 channel bits long or shorter. The longest (14 channel bits) marks and spaces occur regularly every 1,488 channel bits, and only at that regular interval. Every longest mark or space is followed by a shortest (3 channel bits) mark or space. Drives in accordance with the invention may be used to always write the longest mark at a precise predetermined spatial position relative to a zero-crossing of the spatial groove wobble.

Figure 2:
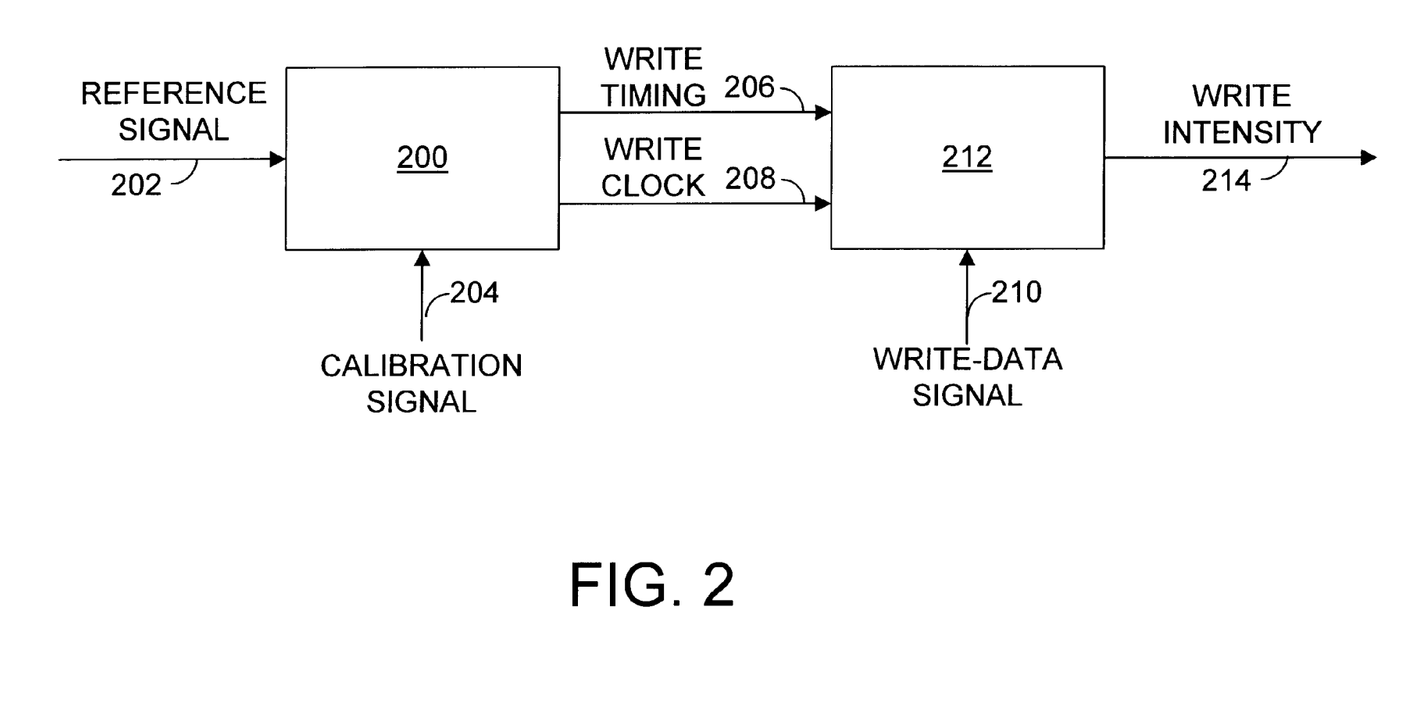
FIG. 2 is a high level block diagram of part of a calibration system in accordance with the invention.

FIG. 2 is a high level block diagram illustrating the relationship of various signals of interest in a system in accordance with the invention. A calibration circuit 200 receives a reference signal 202, and a Calibration signal 204. The calibration circuit 200 generates a Write-Timing signal 206, which is offset in phase relative to the reference signal, and also generates a Write-Clock signal 208. In general, the Write-Timing signal 206 is phase-locked to the reference signal 202, and the two signals may be the same frequency, or the frequency of one signal may be an integer multiple of the frequency of the other signal. The Calibration signal 204 is used to control the phase offset of the Write-Timing signal 206 relative to the reference signal 202. A write circuit 212 receives the Write-Timing signal 206, the Write-Clock signal 208, and a Write-Data signal 210. The write circuit 212 generates a Write-Intensity signal 214, corresponding to the Write-Intensity signal 122 in FIG. 1. The write circuit 212 may, for example, write an edge of a mark or space (as specified by the Write-Data signal 210) at N Write-Clock cycles (208) from a specified edge of the Write-Timing signal 206.

Figure 3A:
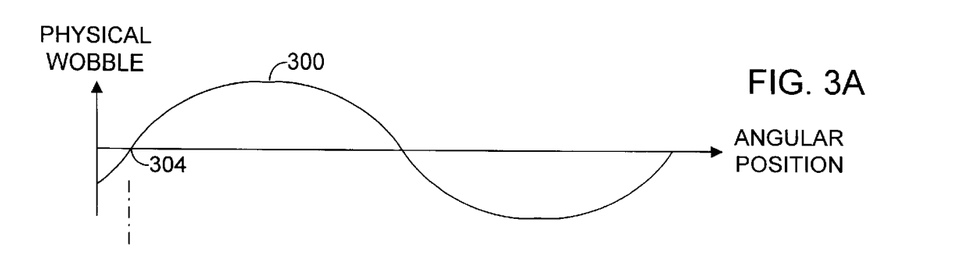
FIG. 3A is a graph of spatial wobble as a function of angular position.
Figure 3B:
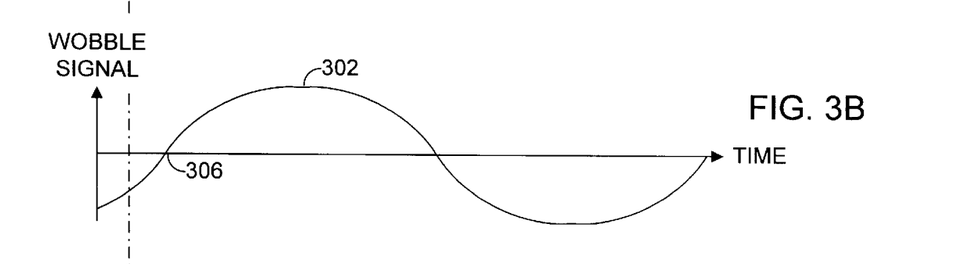
FIGS. 3B–3D are example signal waveforms, illustrating timing of signals from FIG. 2, corresponding in time to the spatial wobble of FIG. 3A.
Figure 3C:
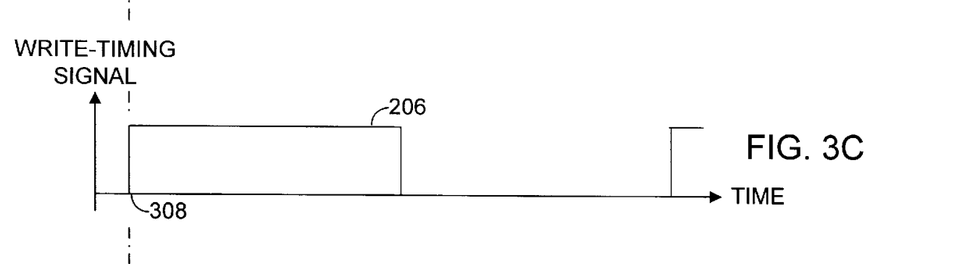
Figure 3D:
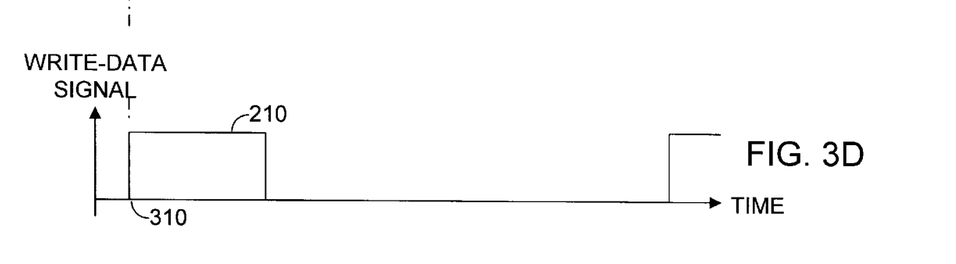

FIGS. 3A–3D illustrate the timing relationships among some of the signals illustrated in FIG. 2. As discussed above, in at least one proposed drive standard, a reference signal is derived from spatial wobble. FIG. 3A illustrates spatial wobble as a function of angular position. A radially modulated groove wall 300 has a spatial zero-crossing at angular position 304. FIG. 3B illustrates a reference signal 302 (corresponds to FIG. 2, 202), resulting from sensing light from the spatial wobble 300 as the disc is spinning, with a zero-crossing at time 306. Note that there is a delay between the time 304 that a detector receives light from a zero-crossing of spatial wobble, and the time 306 that a zero-crossing occurs in the Wobble signal 302. FIG. 3C illustrates the Write-Timing signal 206. Note that in the steady state, an edge (308) of the Write-Timing signal 206 is earlier than a zero-crossing (306) of the reference signal 302. FIG. 3D illustrates a Write-Data signal 210, with timing referenced from edge time 308 in the Write-Timing signal 206. Note that a mark or space is being written with an edge that is essentially at the zero-crossing 304 of spatial wobble 300, as specified in a proposed standard.

Figure 4:
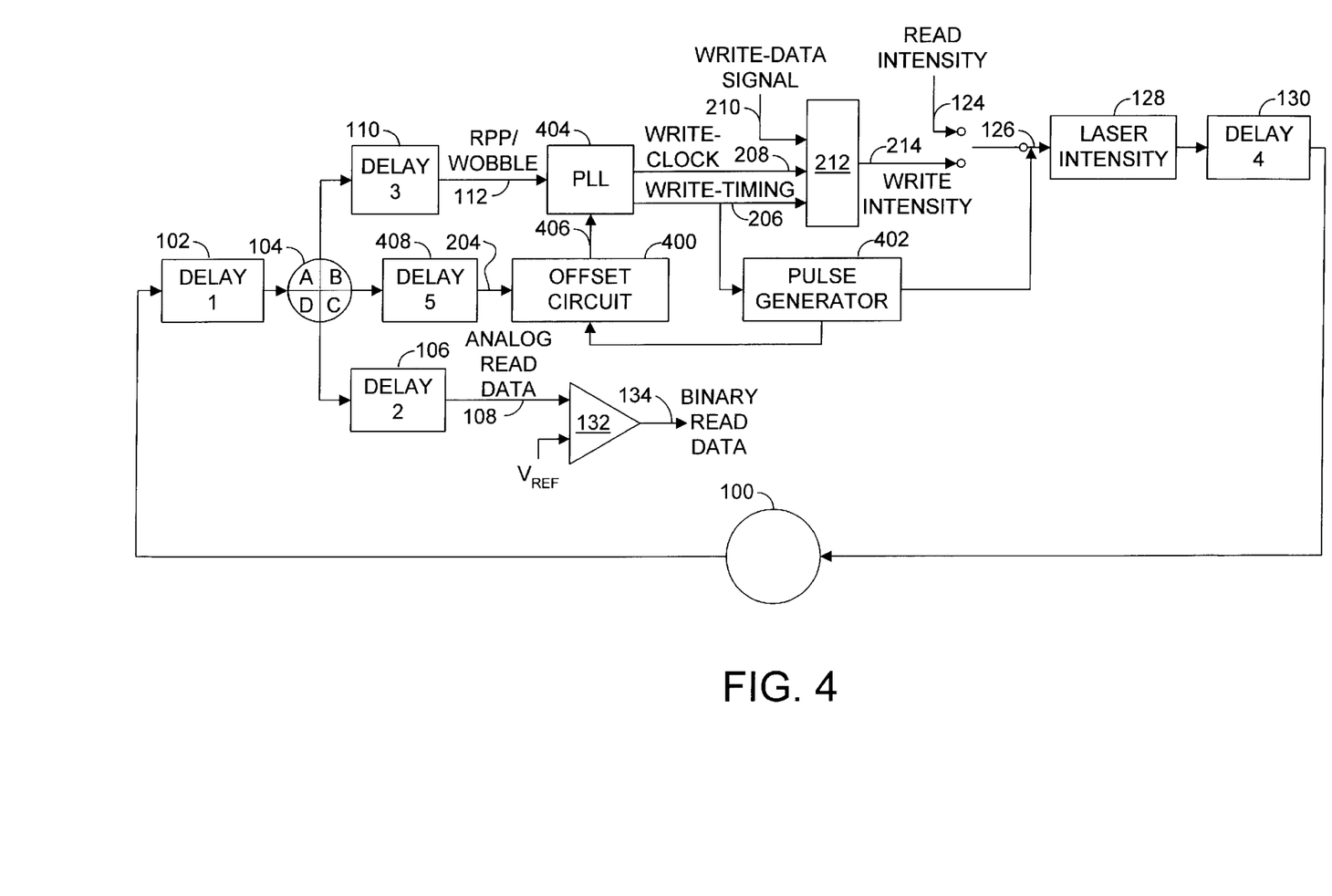
FIG. 4 is a block diagram of signal paths for an example embodiment of an optical disc drive, including the calibration system of FIG. 2 in accordance with the invention.

FIG. 4 shows a block diagram of an example drive system using a quad-detector as in FIG. 1, but with write timing calibration circuitry in accordance with the invention. An offset circuit 400 and a pulse generator 402 have been added. PLL 114 in FIG. 1 is modified as PLL 404 in FIG. 4. The offset circuit 400 and the PLL 404, combined, illustrate an example embodiment of calibration circuit 200 in FIG. 2. Calibration signal 204, Write-Timing signal 206, Write-Clock signal 208, Write-Data signal 210, and Write-Intensity signal 214, all correspond to identically numbered signals in FIG. 2. In FIG. 4, Calibration signal 204 is delayed by Delay 5 (408).

The offset circuit 400 receives a Calibration signal 204 that is a combination of information used to generate the Analog Read-Data signal (108), and information used to generate the RPP/wobble signal (112). For example, assume that RPP/wobble is (A+B)−(C+D). Ignoring delays, algebraically, Read-Data+RPP/wobble=[(A+B)+(C+D)]+ [(A+B)−(C+D)]=2(A+B). Accordingly, one suitable combination for Calibration signal 204 is A+B. Other combinations may also be suitable, as long as both wobble information and data (overall intensity) information are included. The offset circuit 400 provides a phase offset signal 406, which is used to adjust the phase of the Write-Timing signal 206 relative to the phase of the RPP/wobble signal 112, as illustrated in FIGS. 3A–3D. The pulse generator 402 receives the Write-Timing signal 206 from the PLL 404, and adds pulses to the Read-Intensity signal (124) during reading (and to Write Intensity 214 during writing of amorphous areas). During reading (or during writing of amorphous areas), the offset circuit 400 determines whether the pulses are symmetrical about a peak of the Wobble signal, by measuring the relative amplitudes of the intensity pulses as detected in the Calibration signal 204 (wobble plus data), and generates a phase offset signal 406 as a function of the relative amplitudes of the detected pulses. During writing of crystalline areas, the offset circuit 400 measures the relative amplitudes of write intensity pulses as detected in the Calibration signal 204.

Note that the Calibration signal 204, as a result of amplification and filtering, is also delayed, as depicted by Delay 5 (408) in FIG. 4. In addition, the calibration pulses are also delayed by Delay 4 and Delay 1, which are typically negligible relative to Delay 5. It is important to note that all components of the calibration signal are delayed substantially equally. That is, the wobble component, and the data (total intensity) component, are both delayed equally by Delay 5, and the additional delay for the pulses (Delay 4 plus Delay 1) can be ignored. It is not necessary to explicitly measure Delay 5, or any other delay, as will be seen in the following discussion. Instead, the timing for writing is adjusted by observing the timing of the intensity pulses, relative to the reference signal, as measured in the calibration signal.

For calibration during reading, the pulses are preferably generated during a longest (14T) mark or space, because during a longest mark or space, transitions of the data portion of the Calibration signal do not interfere with the operation of the calibration circuit, and conversely, the pulses do not interfere with data signal transitions. Placing the pulses about 8T apart, during reading or writing of a 14T longest mark, enables a calibration adjustment of about plus or minus 4T. Since the longest mark or space occurs regularly every 1,488 channel bits, the phase of the Write-Timing signal may be adjusted repeatedly every 1,488 channel bits during reading. Time averaging reduces noise. Path delay compensation in accordance with the invention can occur repeatedly without disrupting normal reading or writing.

Figure 5A:
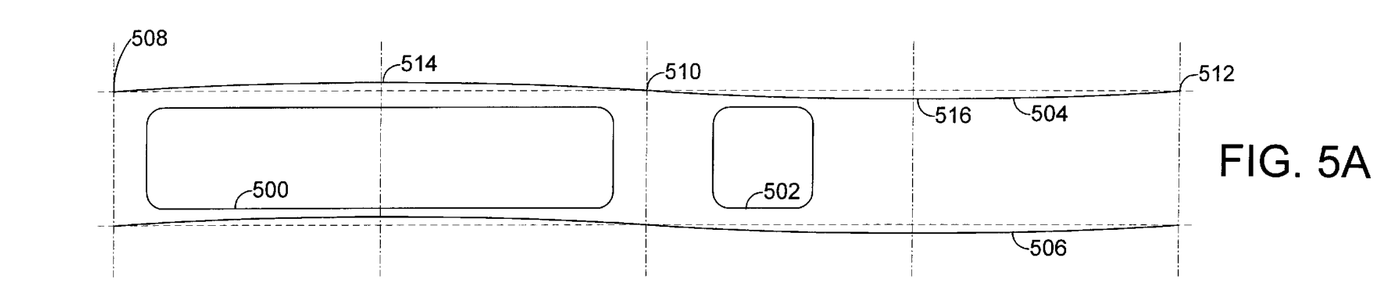
FIG. 5A is a plan view of an optical disc, depicting data marks and spaces in a wobbled groove.

FIG. 5A illustrates a longest mark 500 and a shortest mark 502 in a groove. The groove walls 504 and 506 are sinusoidally radially displaced (wobbled). For example, groove wall 504 has spatial zero-crossings at positions 508, 510, and 512, and has spatial peak radial displacements at positions 514 and 516. Recall from the discussion above that as the disc rotates, spatial frequencies on the disc are translated into temporal frequencies in various signals from the optical transducer. Accordingly, FIGS. 5B–5E illustrate various temporal waveforms of interest resulting from the spatial marks and wobbled groove illustrated in FIG. 5A. In FIGS. 5B–5E, the signals are depicted as having no delay.

Figure 5B:
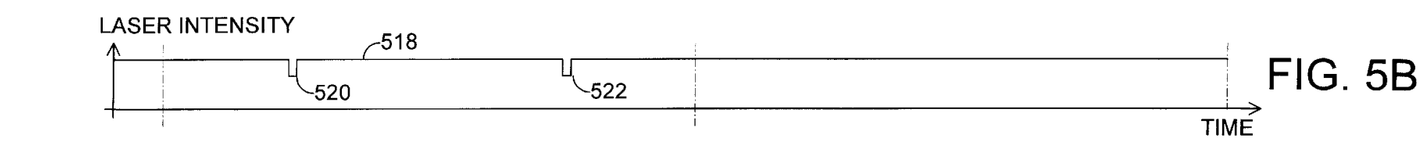
FIGS. 5B–5E are signal waveforms during reading, including the calibration signal of FIGS. 2 and 4, corresponding in time to the spatial data marks and spaces of FIG. 5A.

FIG. 5B depicts an intensity signal 518 to the laser diode (corresponds to signal 126 in FIGS. 1 and 4), during reading, with two pulses 520 and 522 injected by the pulse generator (FIG. 4, 402) in accordance with the invention. Pulses 520 and 522 ideally are symmetrical about the peak 514 of the spatial groove wobble. The magnitude of pulses 520 and 522 is sufficient to be readily detectable in the analog Calibration signal (FIGS. 2 and 4, 204), but the magnitude is such that the Binary Read-Data signal (FIGS. 1 and 4, 134) is not affected.

Figure 5C:
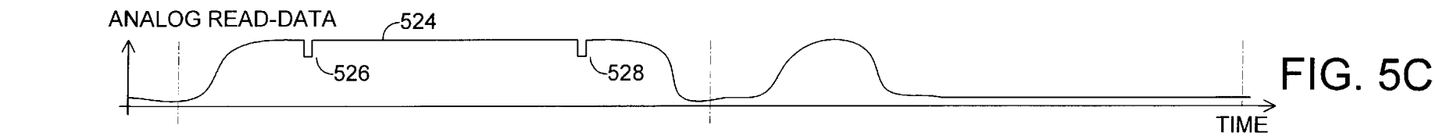

FIG. 5C illustrates the Analog Read-Data signal 524 (corresponds to signal 108 in FIGS. 1 and 4) resulting from marks 500 and 502 and intensity signal 518. Pulses 526 and 528, resulting from pulses in the laser intensity from pulses 520 and 522 in the Laser Intensity signal 518, are insufficient to impact the resulting binary Read-Data signal (FIGS. 1 and 4, 134). Note that for the waveforms depicted in FIGS. 5B–5D, high and low, and positive and negative, are arbitrarily chosen for illustration. That is, the analog data signal in FIG. 5C could be low during a mark, and high during spaces between marks. In addition, pulses 520 and 522 could be positive instead of negative.

Figure 5D:
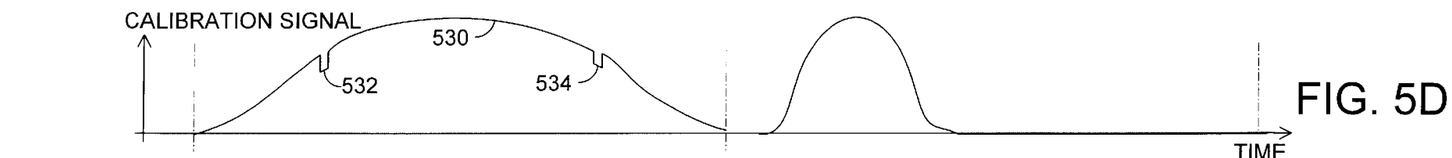
Figure 5E:
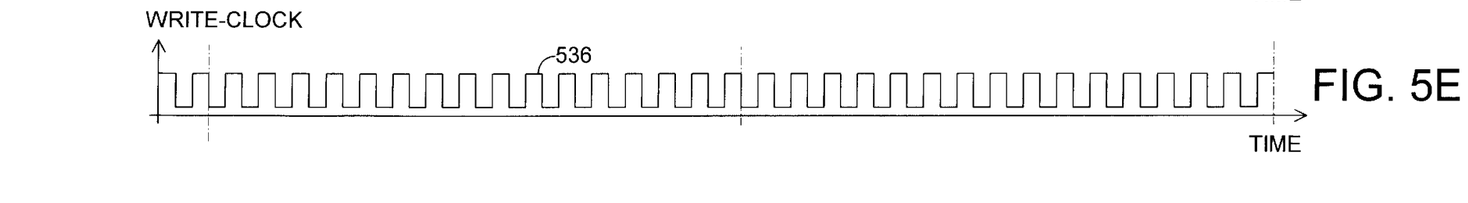

FIG. 5D illustrates the Calibration signal 530 (corresponding to the Calibration signal 204 in FIGS. 2 and 4) that combines wobble information and data information (for example, A+B). The waveform in FIG. 5D includes pulses 532 and 534, and wobble information. The waveform in FIG. 5D is ideal in that pulses 532 and 534 are depicted as symmetrical in time around the spatial wobble peak 514. In general, before calibration this will not be true, and as discussed in more detail below, drives in accordance with the invention adjust the phase of the Write-Timing signal until the condition depicted in FIG. 5D is true. FIG. 5E illustrates a Write-Clock signal 536 (corresponds to signal 208 in FIGS. 2 and 4), derived from the spatial groove wobble. The Write-Clock frequency depicted in FIG. 5E is 32 times the wobble frequency.

Figure 6A:
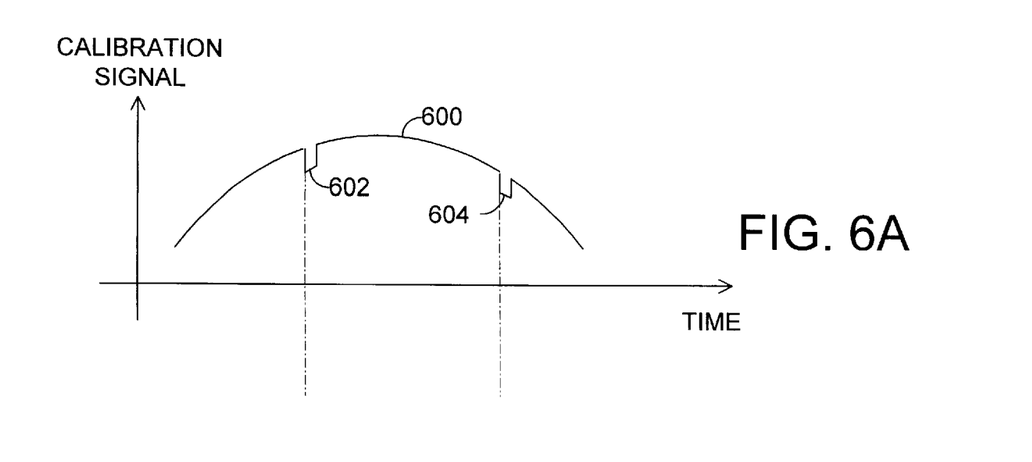
FIGS. 6A and 6B are example signal waveforms representing the calibration signal of FIGS. 2 and 4, during reading.

FIG. 6A illustrates a waveform 600, corresponding to part of the Calibration signal 204 in FIGS. 2 and 4, and corresponding to part of the waveform in FIG. 5D. However, in FIG. 6A the pulses 602 and 604 are later in time relative to the peak of the wobble component of the Calibration signal. As will be discussed in more detail below, the calibration circuit (FIGS. 2, 200) adjusts the Write-Timing signal (FIGS. 2, 3C, and 4, 206), thereby adjusting when the pulses 602 and 604 are generated, until the pulses 602 and 604 are of equal amplitude.

Figure 6B:
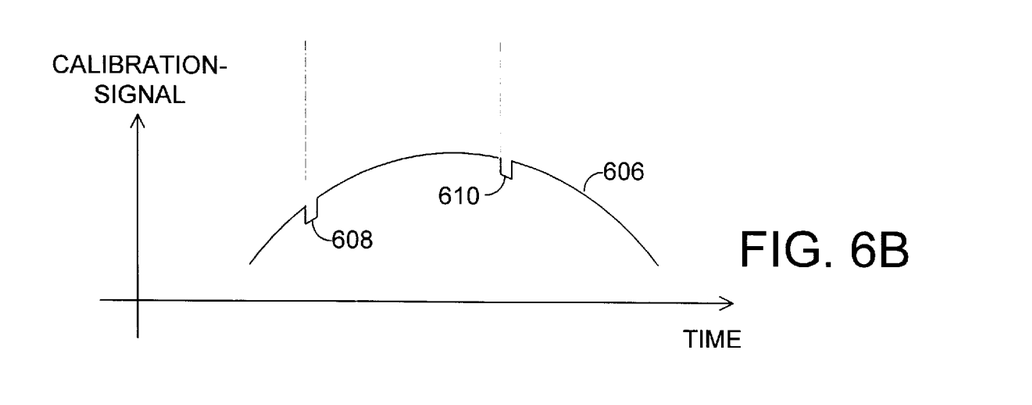

FIG. 6B illustrates a waveform 606, corresponding to part of the Calibration signal 204 in FIGS. 2 and 4, and corresponding to part of the waveform in FIG. 5D. However, the pulses 608 and 610 are earlier in time relative to the peak of the wobble component of the Calibration signal. As will be discussed in more detail below, the calibration circuit (FIG. 2, 200) adjusts the Write-Timing signal (FIGS. 2, 3C, and 4, 206), thereby adjusting when the pulses 608 and 610 are generated, until the pulses 608 and 610 are of equal amplitude.

Signal path delay compensation is also needed during writing. During writing of a space, the laser power is held constant at a high erase level, creating an amorphous area. Therefore, during writing of a space, the normally constant write power can be pulsed by the pulse generator (FIG. 4, 402), just as read power is pulsed during reading. When writing a mark, a lower average laser power is achieved by pulsing the laser, creating a crystalline area. In the example embodiment, these pulses occur on Write-Clock edges (FIGS. 2 and 4, 208) and the same pattern is used every time. In the example embodiment, the Write-Intensity signal (FIGS. 2 and 4, 214) is referenced from the Write-Timing signal 206, with pulses generated from the Write-Clock signal (FIGS. 2 and 4, 208).

Figure 7A:
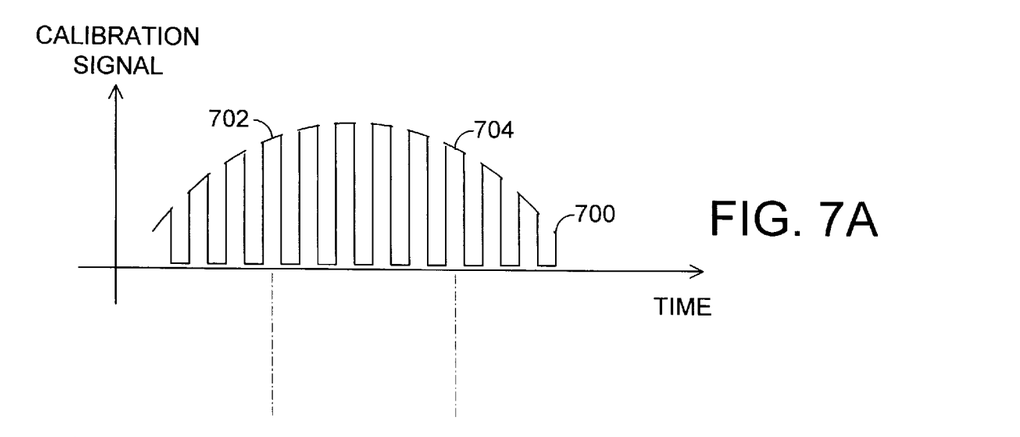
FIGS. 7A and 7B are example signal waveforms representing the calibration signal of FIGS. 2 and 4, during writing of a crystalline area.
Figure 7B:
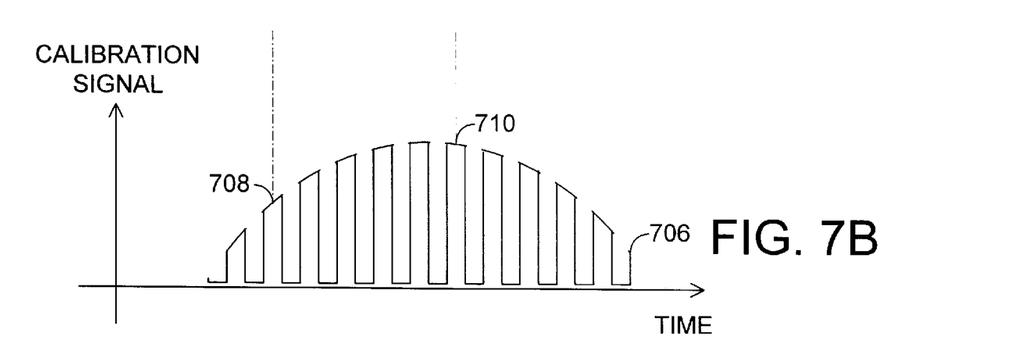

FIGS. 7A and 7B illustrate waveforms 700 and 706, corresponding to part of the Calibration signal 204 in FIGS. 2 and 4, during writing of a longest mark. Note that even though the drive is writing, the laser intensity modulation is detectable in the Calibration signal. Two particular write times may be selected for calibration. For example, in FIG. 7A, samples may be taken at the times indicated by reference numbers 702 and 704, and in FIG. 7B, samples may be taken at the times indicated by reference numbers 708 and 710.

Figure 8A:
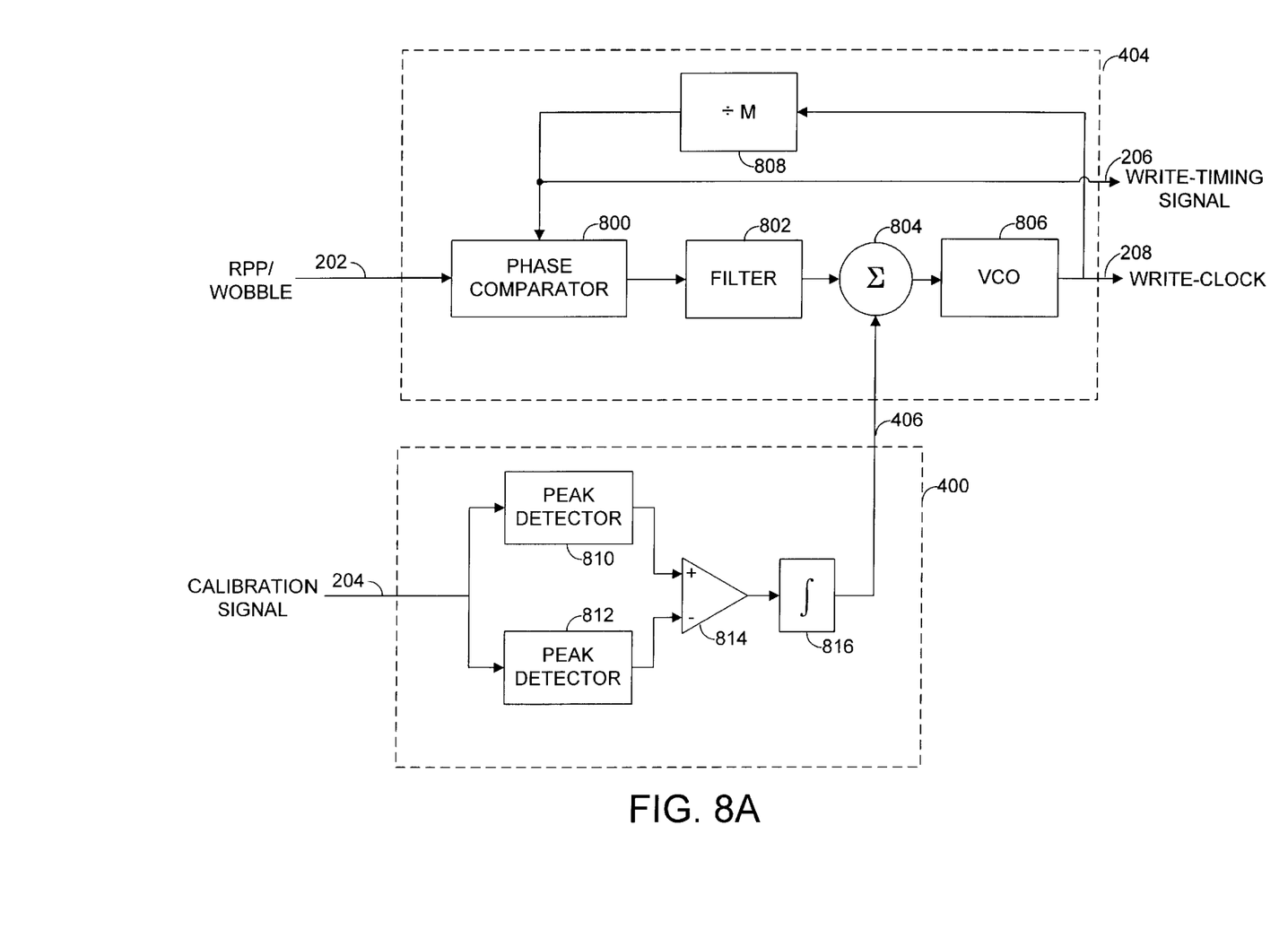
FIG. 8A is a block diagram illustrating additional detail for a first example embodiment of a calibration circuit illustrated in FIGS. 2 and 4.
Figure 8B:
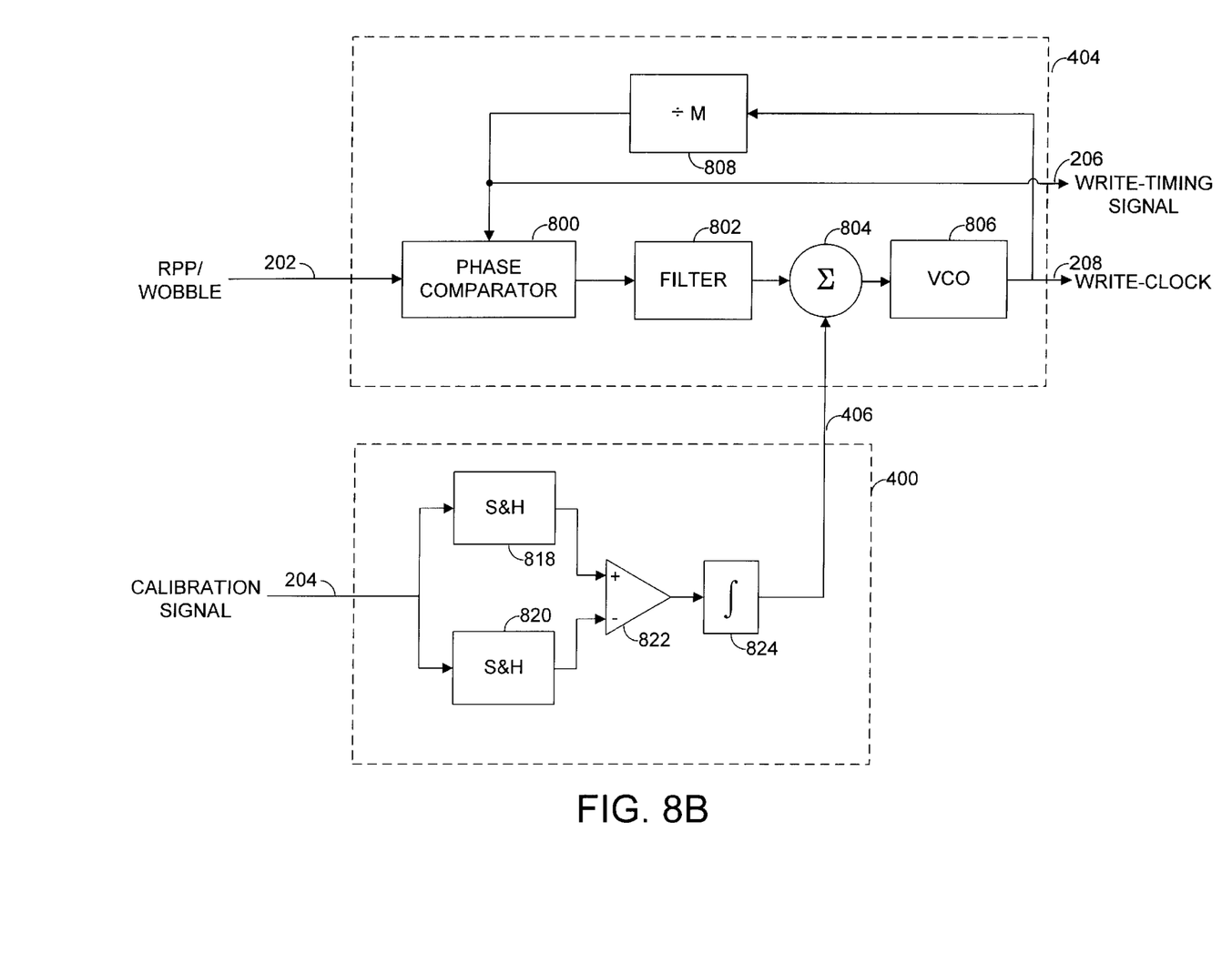
FIG. 8B is a block diagram illustrating additional detail for a second example embodiment of a calibration circuit illustrated in FIGS. 2 and 4.

FIGS. 8A and 8B provide additional detail for an example embodiment of the PLL (FIG. 4, 404), and two example embodiments of the offset circuit (FIG. 4, 400). In FIGS. 8A and 8B, The PLL 404 compares (phase comparator 800) the phase of an input signal (RPP/wobble 202) to the phase of a feedback signal (206). In general, in a PLL, the feedback signal may be divided by an integer M, so that the PLL output frequency is M times the PLL input frequency. Accordingly, in FIGS. 8A and 8B, the feedback signal 206 is the output signal (Write-Clock 208) divided by an integer M (element 808). The phase comparator 800 generates a phase error signal that is filtered (802). The filtered error signal controls a Voltage Controlled Amplifier (VCO) 806. PLL 404 differs from a conventional PLL in that the phase error signal can be further modified by an external phase offset signal 406, through a summing device 804, and also differs in that the feedback signal 206 is provided as an additional output signal (Write-Timing signal).

In FIG. 8A, the Calibration signal 204 (combined wobble and data information) is received by two peak detector circuits (810 and 812). The initial timing of the peak detection is controlled by the pulse generator (FIG. 4, 402). For example, for a pair of pulses from the pulse generator, peak detector 810 may open a detection window at the time of the first pulse, and peak detector 812 may open a detection window at the time of the second pulse. Note that the peak detector circuits are triggered when the intensity pulses are initiated, but the result of the intensity pulses is delayed by Delay 4, Delay 1, and Delay 5 (FIG. 4). Accordingly, each peak detection window needs to be wider than the combined delays to ensure capture of the pulses.

In FIG. 8B, the Calibration signal 204 (combined wobble and data information) is received by sample-and-hold circuits (818 and 820). The initial timing of each sample-and-hold circuit is controlled by the pulse generator (FIG. 4, 402). For example, for a pair of pulses from the pulse generator, sample-and-hold circuit 818 may be triggered at the time of the first pulse, and sample-and-hold circuit 820 may be triggered at the time of the second pulse. Note that the sample-and-hold circuits are triggered when the intensity pulses are initiated, but the result of the intensity pulses is delayed by Delay 4, Delay 1, and Delay 5 (FIG. 4). Accordingly, the pulse width needs to be longer than the combined delay times to ensure that the pulses will be sampled during the sample time.

Whether the offset circuit (FIG. 4, 400) uses peak detectors (FIG. 8A) or sample-and-hold circuits (FIG. 8B), the detected signal magnitudes are compared by difference amplifiers (814, 822), and integrated (816, 824). The integrated output 406 of the offset circuit 400 provides an offset (summation 804) to the phase error signal in the PLL 404. In the example PLL illustrated in FIGS. 8A and 8B, there is only one voltage V at the input to the VCO 806 that results in an output Write-Clock (208) frequency that is M times the input Wobble (202) frequency. In the steady state, the filter 802 output, minus the offset voltage 406 from the calibration circuit, must equal voltage V. If the offset voltage 406 is zero, for example before calibration, the filter 802 output must be voltage V. If the steady-state offset voltage 406 is non-zero, the filter 802 output must change to something other than V, which means that the phase of feedback signal 206, relative to Wobble 202, must change. Therefore, in the steady state, a change in the offset voltage 406 results in a change in the phase of the feedback signal 206, without changing the frequency of the Write-Clock (208) or the feedback signal (206). Changing the phase of the feedback signal 206 changes the timing of pulses generated by the pulse generator (FIG. 4, 402) and changes the timing of writing.

Using the example circuits of FIGS. 8A and 8B, consider the Calibration waveform 600 in FIG. 6A. Assume that the amplitude (relative to a reference voltage such as ground) of the first pulse 602 is measured by peak detector 810 or sample-and-hold circuit 818, and the amplitude of the second pulse 604 is measured by peak detector 812 or sample-and-hold circuit 820. Recall that the pulses 602 and 604 are generated at a time that is relative to an edge in the Write-Timing signal (FIGS. 2, 3C, and 4, 206), which is also the feedback signal in the PLL. The amplitude of the first pulse 602 is greater than the amplitude of the second pulse 604, resulting in a positive output for the difference amplifier (FIG. 8A, 814, or FIG. 4B, 822). The integrated positive output for the difference amplifier temporarily causes a slight increase in the frequency of the VCO (FIGS. 8A and 8B, 806), changing the phase of the feedback signal 206, causing the phase comparator (FIGS. 8A and 8B, 800) to generate a compensating voltage, returning the frequency of the VCO to its steady state value, but resulting in moving an edge of the feedback signal 206 earlier in time relative to the reference signal 202 (Wobble in the example embodiments). Note that because of the integrators (FIG. 8A, 816 or FIG. 8B, 824), the offset 406 from the offset circuit 400 remains present after the phase comparator 800 generates a compensating voltage, so that the resulting offset 406 remains after the pulses are symmetrical as in FIG. 5D.

Using the example circuits of FIGS. 8A and 8B, consider the Calibration waveform 606 in FIG. 6B. The amplitude of the first pulse 608 is less than the amplitude of the second pulse 610, resulting in a negative output for the difference amplifier (814, 822). The integrated negative output of the difference amplifier temporarily slightly decreases the frequency of the VCO 806, causing the phase comparator 800 to generate a compensating voltage, shifting the pulses (608, 610) later in time relative to wobble as detected in the Calibration signal.

Using the example circuits of FIGS. 8A and 8B, consider the Calibration waveforms 700 and 706 in FIGS. 7A and 7B. For calibration during writing of a longest mark, sample times 702 and 708 (and 704 and 710) are synchronous with edges of the Write-Clock signal (FIGS. 2 and 4, 208), and are timed relative to an edge of the Write-Timing signal (FIGS. 2, 3C, and 4, 206). thereby ensuring that the peak-detector circuits (FIG. 4A) are triggered before specific power pulses, or sample-and-hold circuits (FIG. 4B) are triggered during specific power pulses. However, the phase relationship of the power pulses relative to a zero-crossing of the wobble component of the Calibration signal (700, 706) varies, resulting in unequal sample amplitudes, as illustrated by the pulse amplitudes in FIGS. 7A and 7B. The offset circuit 400 is then used to adjust the phase of the Write-Timing signal 206 in the PLL until the two samples are of equal magnitude.

During writing of a longest mark (FIGS. 7A and 7B), the pulse generator (FIG. 4, 402) is not used to inject pulses into the laser power signal. However, the pulse generator 402 may still be used to trigger the peak detector circuits (FIG. 8A) or the sample-and-hold circuits (FIG. 8B). In addition, the timing of write power pulses (FIGS. 7A and 7B) may be used to specify the timing of pulses generated by the pulse generator 402 during both reading and writing. For example, assume that in FIGS. 7A and 7B, times 702 and 708 are at "J" falling Write-Clock edges (208) after an edge of the Write-Timing signal 206. Likewise, assume that times 704 and 710 are at "K" falling Write-Clock edges (208) after an edge of the Write-Timing signal 206. Then, in FIGS. 5B, 5C, 5D, 6A, and 6B, pulses 520, 526, 532, 602, and 608 respectively may be generated at "J" falling Write-Clock edges after an edge of the Write-Timing signal 206. Likewise, in FIGS. 5B, 5C, 5D, 6A, and 6B, pulses 522, 528, 534, 604, and 610 respectively may be generated at "K" falling Write-Clock edges after an edge of the Write-Timing signal 206. Accordingly, the pulse generator 402 may be used to consistently trigger the peak-detector circuits (FIG. 8A) or the sample-and-hold circuits (FIG. 8B), whether the drive is reading a longest mark or space, or writing a longest mark or space.

Figure 9:
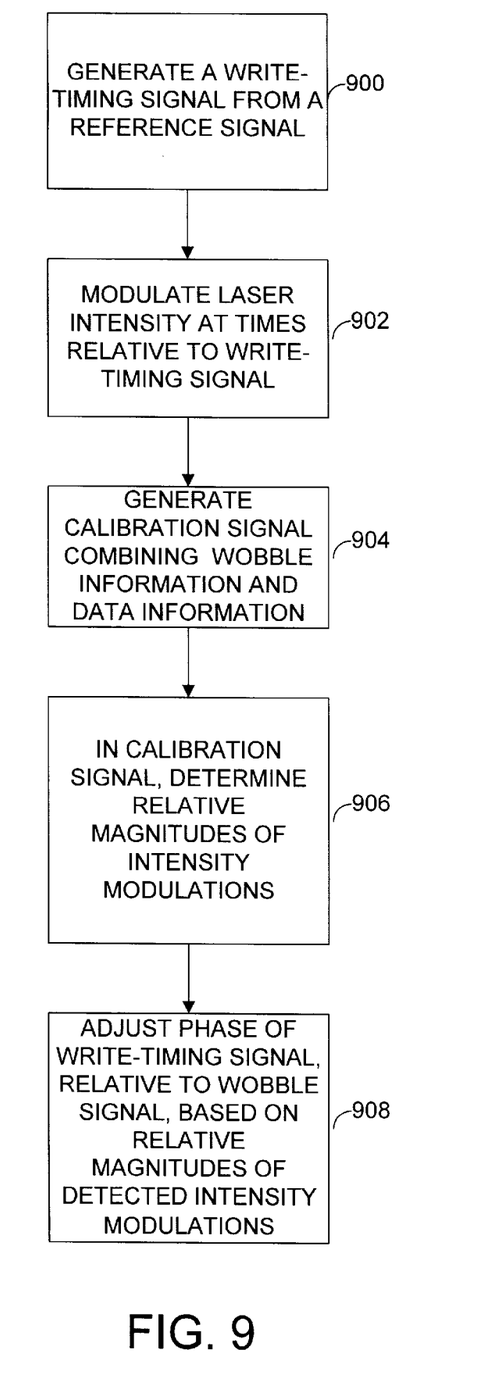
FIG. 9 is a flow chart of a method in accordance with the invention.

FIG. 9 illustrates a method in accordance with the invention. At step 900, a Write-Timing signal is generated from a reference signal. At step 902, the laser is modulated at times relative to the Write-Timing signal. At step 904, a calibration signal is generated that is a combination of wobble information and data information. At step 906, the relative magnitudes of the laser intensity modulations, as detected in the calibration signal, are measured. At step 908, the phase of the reference signal, relative to wobble, is adjusted, based on the timing detected in step 906.

The following is a summary to tie together the above discussions of the figures. Assume, for example, that a data mark is to be written starting at a zero-crossing of the spatial wobble. Because of Delay 3 (FIG. 1, 110), the apparent zero-crossing (as detected in the Wobble signal 112) is late (FIG. 3B), and because of delays in the PLL 114 and latch 120, the mark is written even later, so that without compensation the data mark would be written after the spatial wobble zero-crossing. Calibration pulses are written by a pulse generator (FIG. 4, 402) at a fixed number of Write-Clock cycles (FIGS. 2 and 4, 208) relative to the Write-Timing signal (FIGS. 2, 3C, and 4, 206). The pulse generator may also be used to trigger the peak-detector circuits (FIG. 8A, 810, 812) or the sample-and-hold circuits (FIG. 8B, 818, 820), during reading or writing. The calibration method adjusts the phase of the PLL feedback signal 206 so that the feedback signal leads the Wobble signal 202. Typically, at initialization, because of Delay 3 (FIG. 1, 110), the Wobble signal is delayed, so that the situation is as depicted in FIGS. 6A and 7A. That is, the pulses are late relative to spatial wobble. By adjusting the phase-locked-loop feedback signal so that the pulses are written earlier relative to the Wobble signal, the pulses are moved relative to spatial wobble. Once the feedback signal has been adjusted to make the pulses symmetrical, the feedback signal may be used as the Write-Timing reference for writing data.

As discussed above, for a system in accordance with the invention, no spatial feature other than wobble is required. This is of particular interest for a proposed standard that specifies wobble. However, the invention can be used with any repetitive reference signal, and in particular the invention may be used with reference signals that are derived from spatial features other than wobble, or spatial features in conjunction with wobble. In the example embodiments, pulses are generated symmetrical in time relative to a peak of the Wobble signal. This choice is based on an assumption that an edge of a longest mark starts at a zero crossing of spatial wobble, and the resulting pulses are not near edges of marks and spaces. Alternatively, for other formats, pulses could be generated symmetrical in time relative to a zero crossing of the Wobble signal, or relative to some spatial feature other than wobble. Even without wobble, pulses may be injected during reading, and timing of the pulses in a calibration signal may be determined by using timing measurements instead of by comparing magnitudes. In the example embodiments, a phase-locked-loop is used to illustrate one way to generate a Write-Timing signal that is earlier in phase than the reference signal. There are other circuits that could be used to provide the same end result. For example, there are delay-locked-loops with slightly different circuitry than phase-locked-loops. One could use a tuned circuit oscillator, with a variable component that determines the phase of the oscillator. One could trigger a variable delay from a zero-crossing of the Wobble signal, and delay a time corresponding to almost a full (or half) cycle of the Wobble signal for the Write-Timing signal. Note that in the example embodiments, the Write-Timing signal is at the same frequency as the reference signal, and offset in phase, but in general the two signals do not have to have the same frequency. They just need be phase-locked.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method, in an optical disc drive, for adjusting a time of writing data, the method comprising:

receiving a calibration signal that is a function of timing reference information and data information;

measuring at least two magnitudes of the calibration signal; and adjusting a time of writing, relative to a reference signal, depending on relative magnitudes of the measurements of the calibration signal.

2. A method as in claim 1, further comprising:

the reference signal being proportional to a periodic radial displacement of a wall of a groove on the disc.

3. A method as in claim 1, further comprising:

modulating, during reading, the intensity of a laser used for illuminating the disc during reading.

4. A method as in claim 3, the step of modulating further comprising:

pulsing the intensity of the laser.

5. A method as in claim 3, the step of modulating further comprising:

modulating, while reading a mark having a read time that is longer than a time between modulations.

6. An optical disc drive, comprising:

an offset circuit, receiving a calibration signal that is a function of timing reference information and data information, and generating an offset signal, the offset signal being a function of a difference between amplitudes of two measurements of the calibration signal; and a clock circuit, receiving a reference signal and the offset signal, and generating a write-timing signal having a phase that is different than a phase of the reference signal, the phase of the write-timing signal being a function of the offset signal.

7. The optical disc drive of claim 6, further comprising:

the reference signal being proportional to a periodic radial displacement of a wall of a groove on the disc.

8. The optical disc drive of claim 6, the clock circuit further comprising:

a phase-locked loop circuit, having a phase comparator, the phase comparator receiving the reference signal and a feedback signal, the write-timing signal comprising the feedback signal.

9. The optical disc drive of claim 6, further comprising:

a laser intensity control circuit that controls an intensity of a laser used for reading and writing; and a pulse generator circuit, coupled to the laser intensity circuit, the pulse generator circuit modulating the intensity of the laser during reading.

10. The optical disc drive of claim 9, further comprising:

the pulse generator circuit generating intensity pulses during reading.

11. The optical disc drive of claim 10, further comprising:

the calibration circuit comparing amplitudes of pulses in the calibration signal, resulting from the intensity pulses generated by the pulse generator circuit.

12. The optical disc drive of claim 6, further comprising:

the calibration circuit comparing amplitudes of pulses in the calibration signal, resulting from modulation of the light intensity during writing.

\* \* \* \* \*